United States Patent [19]

Bowen et al.

[11] 4,209,266
[45] Jun. 24, 1980

[54] SNAP-ON HANDLE STRUCTURE

[75] Inventors: Jack L. Bowen, Gary F. Paulson, both of Waseca, Minn.

[73] Assignee: TRUTH INCORPORATED, Owatonna, Minn.

[21] Appl. No.: 24,910

[22] Filed: Mar. 29, 1979

[51] Int. Cl.² ............................................. F16D 1/06
[52] U.S. Cl. ..................................... 403/329; 16/118; 74/553; 403/359
[58] Field of Search ............... 403/359, 361, 365, 329, 403/330, 319; 16/121, 118; 74/543, 545, 548, 553; 292/353

[56] References Cited

U.S. PATENT DOCUMENTS

| 191,363 | 5/1877 | Naylor | 292/353 |
|---|---|---|---|
| 1,909,353 | 5/1933 | Hughes et al. | 74/543 |
| 2,039,917 | 5/1936 | Michel | 403/202 |
| 2,301,169 | 11/1942 | Engstrom | 403/361 X |
| 2,363,194 | 11/1944 | Nirdlinger | 403/359 |
| 3,222,951 | 12/1965 | Maursey | 74/543 |
| 3,293,938 | 12/1966 | Nestor | 74/552 |
| 3,558,165 | 1/1971 | Lundregan | 403/357 |

FOREIGN PATENT DOCUMENTS 1213513  3/1966  Fed. Rep. of Germany ............ 74/548

Primary Examiner—Andrew V. Kundrat
Attorney, Agent or Firm—Wegner, Stellman, McCord, Wiles & Wood

[57] ABSTRACT

A snap-on handle structure including a handle mountable on a splined operating shaft having a series of teeth, said handle having an internal recess to receive the shaft and having spaced, splined sections in said recess to interfit with the splined operating shaft, and a pair of members extending interiorly along the length of the recess and interfitted with the handle at locations between the splined sections, with each member having a pair of spaced-apart, inwardly-turned elongate flanges to fit between splined teeth on said operating shaft.

9 Claims, 8 Drawing Figures

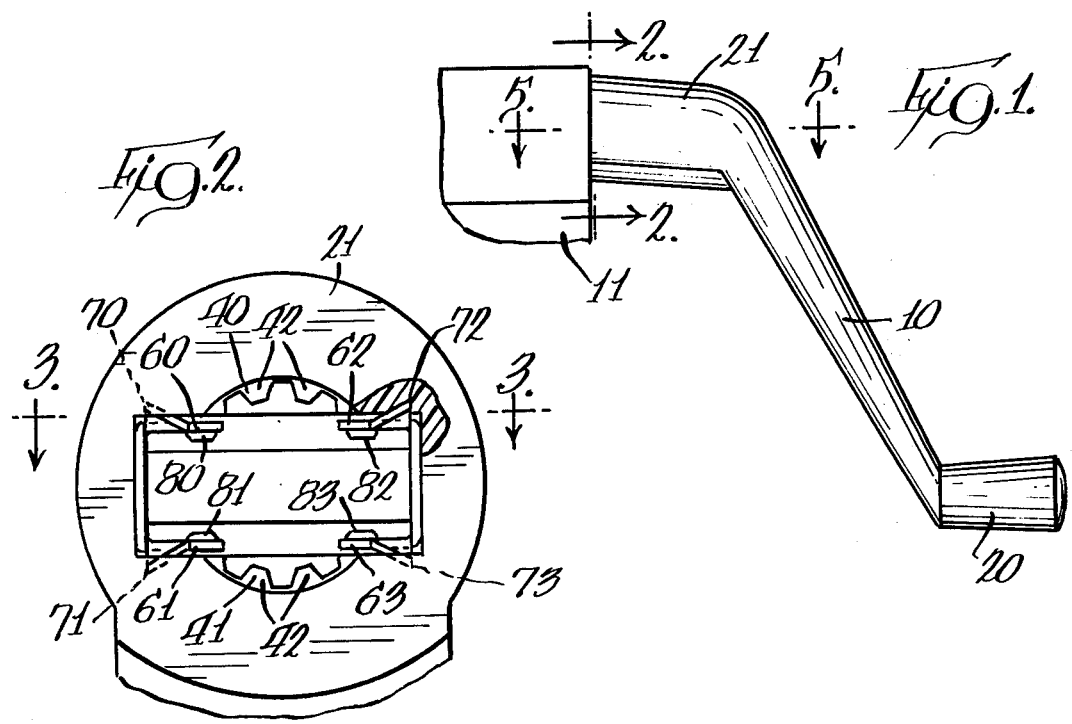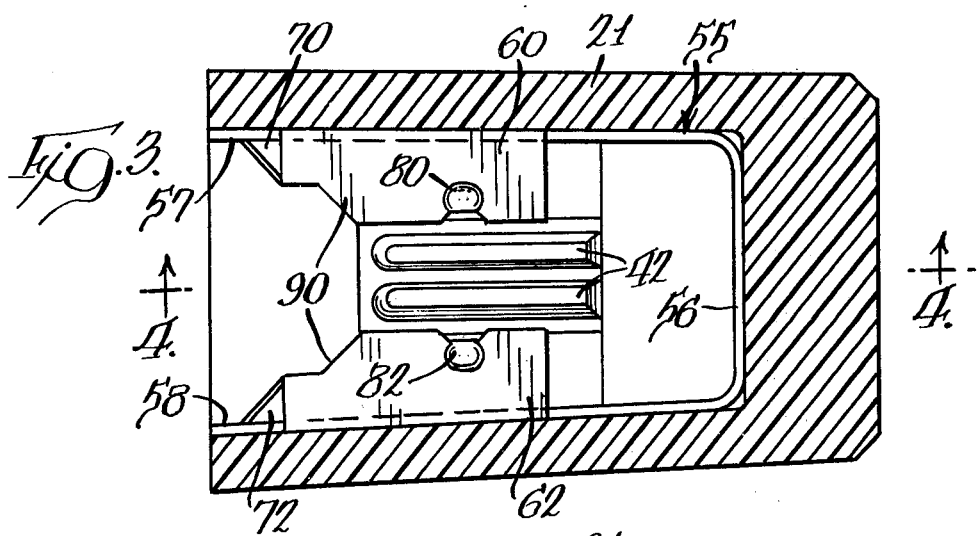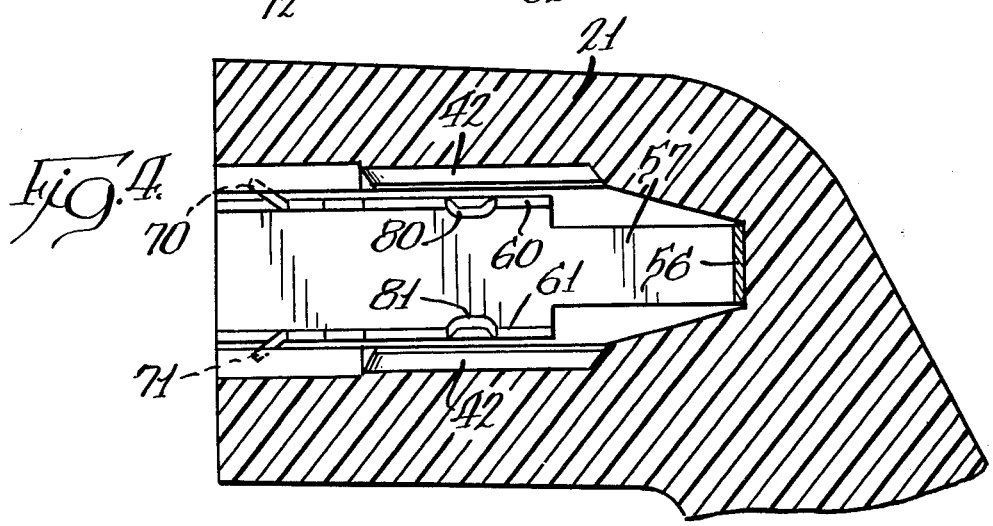

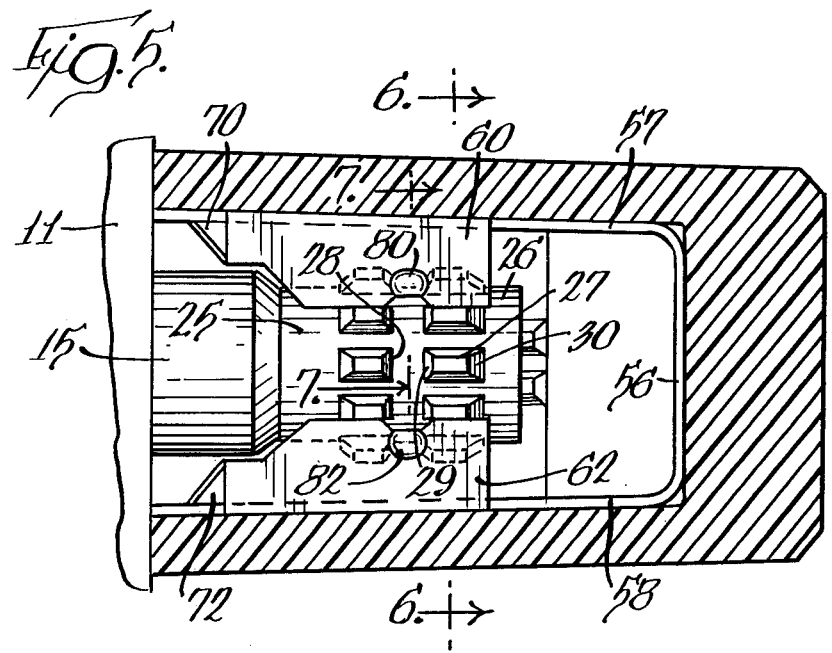
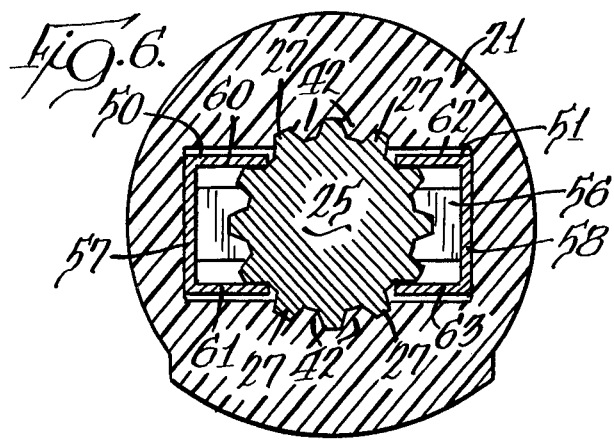
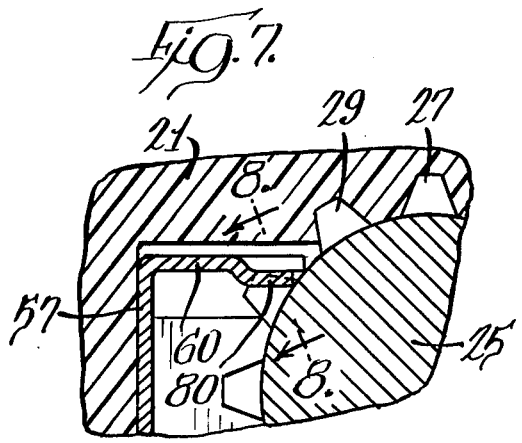
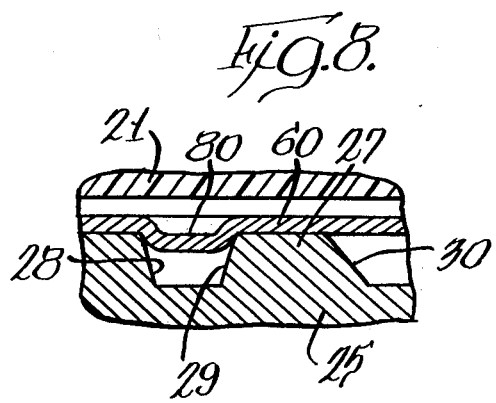

SNAP-ON HANDLE STRUCTURE

BACKGROUND OF THE INVENTION

This invention pertains to a snap-on handle structure which may be easily positioned on an operating shaft and removably retained thereon and wherein the retention structure additionally functions to transmit torque from the handle to the operating shaft during use of the structure.

Snap-on handle structures using a spring clip for retention to avoid the use of a set screw are known. The use of a spring clip has required a reduction in the total area of contact between splines on the operating shaft and the interfitting handle. This has resulted in an inadequate structure for transmitting torque from the handle to the operating shaft with the result that the structure ultimately fails.

One example of a prior art structure is shown in application Ser. No. 863,470, filed Dec. 22, 1977, in the name of George R. Sully, and assigned to the assignee of this application.

SUMMARY OF THE INVENTION

A primary feature of the invention disclosed herein is to provide a snap-on handle structure wherein the handle has a spring clip structure for releasably holding the handle on an operating shaft and wherein such structure contributes to the torque-transmitting capability of the connection between the handle and shaft.

An object of the invention is to provide a snap-on handle structure wherein a handle is mountable on a splined operating shaft, with the handle having an internal recess to receive the shaft and having spaced splined sections to interfit with the splined operating shaft, a pair of members extend along the length of the handle recess and are interfitted therewith at locations between the splined sections with each of the members having a pair of spaced-apart, inwardly-turned flanges to fit between spline teeth on said operating shaft to make torque-transmitting engagement therewith, and means for releasably holding the handle to the operating shaft.

Another object of the invention is to provide a snap-on handle structure wherein the pair of members recited in the preceding paragraph are formed as a pair of legs of a U-shaped spring member, with the legs fitted in grooves formed in the handle body for interlocking therewith and with said flanges extending outwardly from said grooves to extend between spline teeth on the operating shaft.

Still another object of the invention is to provide snap-on handle structure, as defined in the preceding paragraphs wherein at least certain of the teeth on the splined operating shaft are formed with a notch intermediate the ends thereof and each of said flanges has a tab formed thereon for snapping into engagement with a notch upon insertion of the operating shaft into the handle and for yieldably retaining the handle on the operating shaft.

BRIEF DESCRIPTION OF THE DRAWINGS

FIG. 1 is a fragmentary side elevational view of the handle structure

FIG. 2 is a fragmentary vertical end view of the handle taken generally along the line 2—2 in FIG. 1 and on an enlarged scale and with the operating shaft not shown;

FIG. 3 is a plan section, taken generally along the line 3—3 in FIG. 2;

FIG. 4 is a section, taken generally along the line 4—4 in FIG. 3;

FIG. 5 is a sectional view, similar to the view shown in FIG. 3 and with the handle shown in association with the operating shaft;

FIG. 6 is a sectional view, taken generally along the line 6—6 in FIG. 5;

FIG. 7 is a sectional view, taken generally along the line 7—7 in FIG. 5; and

FIG. 8 is a fragmentary section, taken generally along the line 8—8 in FIG. 7.

DESCRIPTION OF THE PREFERRED EMBODIMENT

The snap-on handle structure is shown generally in FIG. 1 wherein a handle 10 is rotatably associated with operating hardware housed within a casing, shown fragmentarily at 11. An operating shaft 15 (FIG. 5) extends outwardly of the casing 11 for connection to the handle 10. The handle 10 has a manually engageable member, such as a knob 20, at one end and, at the other end, has a mounting section 21 having a generally cylindrical body which is formed with an internal recess for placement onto the operating shaft 15 in assembling the handle thereto.

The handle is shown in FIGS. 1 to 4 and is shown in combination with the operating shaft in FIGS. 5 to 8. Reference is first made to the structure of the operating shaft, as shown in FIGS. 5 to 8, to facilitate the description of the handle and structure carried thereby for releasable connection to the operating shaft.

The operating shaft 15 is of the same general construction as that described in the previously identified Sully application. The shaft has a reduced diameter section 25 with a free end 26, as shown in FIG. 5. The reduced diameter section is splined with a series of elongate teeth 27 extending lengthwise thereof to a position short of the free end 26. The teeth 27 are discontinuous to form a series of detent notches having opposed sloped walls 28 and 29. The leading end of each tooth 27 is also inclined, as indicated at 30, to form a cam surface.

The handle mounting section 21 has a shaped internal recess with two elongate splined sections 40 and 41 in spaced opposed relation and with each having at least two teeth 42 for interengagement with the spline on the operating shaft. This splined interengaging relation provides the rotational drive connection between the handle and the operating shaft, but with the interconnection being only with respect to a limited number of teeth on the operating shaft.

The handle mounting section 21 is formed with a pair of elongate grooves 50 and 51 which receive parts of a U-shaped spring member, or clip, indicated generally at 55, having a base 56 and a pair of legs 57 and 58 extending from the base. The legs 57 and 58 constitute a pair of members locked into said grooves and with each member being of a generally U-shaped cross section to have upper and lower flanges extending inwardly to a position of engagement between the teeth 27 of the operating shaft. As shown particularly in FIG. 6, the member 57 has upper and lower flanges 60 and 61, respectively, and the member 58 has upper and lower flanges 62 and 63, respectively, which extend into engagement between teeth 27 of the operating shaft 15.

The U-shaped spring member is provided with barbs for ultrasonic insertion and retention thereof in the handle. The leg 57 has the barbs 70 and 71 and the leg 58 has the barbs 72 and 73. The spring member is inserted until the base 56 thereof engages the bottom of the recess in the handle.

The handle structure is yieldably retained on the operating shaft 15 by detenting thereof to the operating shaft at four places. Each of the leg flanges 60-63 is formed with a tab 80-83, respectively, by deformation of the spring material forming the member 55 whereby upon insertion of the operating shaft into the handle recess the tabs 80-83 may flex outwardly, as permitted by clearance between the member 55 and the surrounding part of the handle body to deflect outwardly to an extent sufficient to clear the teeth 27 as the shaft moves into the recess and when the tabs 80-83 align with the notches between certain of the teeth on the operating shaft the tabs can move inwardly into interlocked relation, as shown in FIG. 7.

The grooves 50,51 are located and the spring member legs 57,58 are dimensioned to assure that the member flanges 60-63 are aligned to pass between spline teeth 27 upon handle movement onto the operating shaft 15 and with an interfit between the shaft spline and the splined sections 40,41 on the handle. The cam surfaces 30 on spline teeth 27 engage the tabs 80-83 to cam the tabs outwardly until they reach the notches between the teeth. Each of the flanges 60-63 has a tapered leading edge 90 to facilitate rotational orientation between the handle and the operating shaft 15.

With the structure disclosed herein, the handle can be yieldably retained on the operating shaft by the interengagement of the tabs and notches on the respective parts and with the torque-transmitting capabilities of the connection increased because of the interengagement of the flanges on the spring clip member with the spline structure of the operating shaft.

We claim:

1. A snap-on handle structure including a handle mountable on a splined operating shaft having a series of teeth, said handle having an internal recess to receive said shaft and having spaced splined sections in said recess to interfit with the splined operating shaft, a generally U-shaped spring member in said recess having a pair of legs extending along the length of said recess and interfitted with the handle at locations between said spline sections, and each of said legs having a pair of spaced-apart inwardly-turned elongate flanges to fit between spline teeth on said operating shaft.

2. A handle structure as defined in claim 1 including means on the spring member to yieldably lock the handle to said shaft.

3. A handle structure as defined in claim 2 wherein certain of said spline teeth on said shaft are notched intermediate their ends and said yieldable locking means comprises a tab on each of said flanges which is engageable in a notch.

4. A handle mountable on a splined operating shaft having a series of teeth, said handle having an internal recess to receive said shaft and having spaced splined sections in said recess to interfit with the splined operating shaft, a pair of members extending along the length of said recess and interfitted with the handle at locations between said spline sections, and each of said members having a pair of spaced-apart inwardly-turned elongate flanges to fit between spline teeth on said operating shaft.

5. A snap-on handle structure mountable on a splined operating shaft having a series of teeth with at least certain of said teeth having a notch intermediate the ends thereof, said handle having a body with an internal recess with two curved splined sections for interengagement with the splined operating shaft, a pair of elongate grooves in said handle body positioned between said two curved splined sections, and a pair of members associated one with each groove to extend longitudinally thereof and being of a generally U-shaped cross section to have a pair of flanges engaging the walls of said groove and extending into spaces between teeth on said operating shaft.

6. A handle structure as defined in claim 5 wherein each of said members has means to lock the member to the handle body.

7. A handle structure as defined in claim 6 wherein each member has a deflectable tab to engage in a notch and yieldably hold the handle on the shaft.

8. A handle structure as defined in claim 7 wherein said members are formed as legs of a U-shaped spring member.

9. A handle mountable on a splined operating shaft having a series of teeth, said handle having an internal recess to receive said shaft and having spaced splined sections in said recess adapted to interfit with the splined operating shaft, a pair of members extending along the length of said recess and interfitted with the handle at locations between said spline sections, and each of said members having at least one inwardly-turned elongate flange adapted to fit between spline teeth on said operating shaft.

* * * * *